United States Patent [19]
Desautels et al.

[11] Patent Number: 5,569,115
[45] Date of Patent: Oct. 29, 1996

[54] ENGINE SPEED SYNCHRONIZATION SYSTEM FOR ASSISTING IN MANUAL TRANSMISSION SHIFTING

[75] Inventors: Thomas Desautels, West Bloomfield; Charles E. Allen, Jr., Rochester Hills; Frank A. Palmeri, Troy, all of Mich.; Jon M. Huber, Laurinburg, N.C.

[73] Assignee: Rockwell International Corporation, Pittsburgh, Pa.

[21] Appl. No.: 508,135

[22] Filed: Jul. 27, 1995

[51] Int. Cl.⁶ ............................................. B60K 41/08
[52] U.S. Cl. .................................. 477/110; 477/111
[58] Field of Search ............................ 477/110, 111

[56] References Cited

U.S. PATENT DOCUMENTS

| | | |
|---|---|---|
| 2,592,375 | 4/1952 | Ball . |
| 2,622,711 | 12/1952 | Chambonneau . |
| 2,940,559 | 6/1960 | Bomhard . |
| 3,272,028 | 9/1966 | Randol . |
| 3,323,621 | 6/1967 | Peras . |
| 3,327,553 | 6/1967 | Peras . |
| 3,335,830 | 8/1967 | Castelet . |
| 3,349,878 | 10/1967 | Castelet . |
| 3,402,793 | 9/1968 | Scholl . |
| 3,667,577 | 6/1972 | Weymann . |
| 3,752,284 | 8/1973 | Brittain et al. . |
| 3,792,630 | 2/1974 | Hause . |
| 3,939,738 | 2/1976 | Adey et al. . |
| 4,009,699 | 3/1977 | Hetzler et al. . |
| 4,019,614 | 4/1977 | Prenzel et al. . |
| 4,034,627 | 7/1977 | Mizote . |
| 4,077,283 | 3/1978 | Hammond . |
| 4,081,065 | 3/1978 | Smyth et al. . |
| 4,200,007 | 4/1980 | Espenschied et al. . |
| 4,223,573 | 9/1980 | Franssen . |
| 4,226,141 | 10/1980 | Espenscheid . |
| 4,266,447 | 5/1981 | Heess et al. . |
| 4,294,341 | 10/1981 | Swart . |
| 4,295,551 | 10/1981 | Zimmermann et al. . |
| 4,331,226 | 5/1982 | Heidemeyer et al. . |
| 4,343,387 | 8/1982 | Hofbauer . |
| 4,380,938 | 4/1983 | Olson . |
| 4,388,843 | 6/1983 | Teeter . |
| 4,401,200 | 8/1983 | Heidemeyer et al. . |
| 4,403,682 | 9/1983 | Norris et al. . |
| 4,493,228 | 1/1985 | Vukovich et al. . |
| 4,527,447 | 7/1985 | Richards . |
| 4,544,057 | 10/1985 | Webster et al. . |
| 4,550,627 | 11/1985 | Lauer et al. . |
| 4,567,758 | 2/1986 | Reynolds et al. . |

(List continued on next page.)

FOREIGN PATENT DOCUMENTS

| | | |
|---|---|---|
| 967268 | 5/1975 | Canada . |
| 2022768 | 11/1970 | Germany . |
| 2106060 | 8/1971 | Germany . |
| 2217482 | 4/1972 | Germany . |
| 2622927 | 12/1976 | Germany . |
| 2018917 | 4/1979 | United Kingdom . |
| 9102912 | 3/1991 | WIPO . |

*Primary Examiner*—Dirk Wright

[57] ABSTRACT

An improved system for synchronizing the output speed of an engine with that necessary at the next expected gear to achieve a desired speed ratio updates and monitors the currently engaged gear. In this way, the system improves upon prior systems that attempted to "count" to determine the currently engaged gear. Moreover, the system provides an operator with a shift intent switch that allows the operator to predict an upshift or a downshift as the next shift. The system calculates what the next expected gear will be based upon this indication. Once the next expected gear is known, the speed ratio at that gear is determined. Once the transmission is moved to neutral, the synchronization speed for the engine is then determined by multiplying the current transmission output speed with that next speed ratio. The engine control drives the engine speed to achieve synchronization speed ratio. The determination is updated as the transmission speed changes. The operator completes the shift with a manual stick shift.

30 Claims, 2 Drawing Sheets

U.S. PATENT DOCUMENTS

| | | |
|---|---|---|
| 4,593,580 | 6/1986 | Schulze . |
| 4,811,224 | 3/1989 | Kuerschner et al. . |
| 4,854,433 | 8/1989 | Tellert . |
| 4,971,183 | 11/1990 | Tellert . |
| 4,974,474 | 12/1990 | Newbigging . |
| 5,033,324 | 7/1991 | Glaser . |
| 5,038,627 | 8/1991 | Schwaiger et al. . |
| 5,042,314 | 8/1991 | Rytter et al. . |
| 5,072,629 | 12/1991 | Hirukawa et al. . |
| 5,089,965 | 2/1992 | Braun . |
| 5,099,711 | 3/1992 | Langbo et al. . |
| 5,172,603 | 12/1992 | MacInnis . |
| 5,199,314 | 4/1993 | Hutchison . |
| 5,216,931 | 6/1993 | Hirsch et al. . |

5,569,115

ENGINE SPEED SYNCHRONIZATION SYSTEM FOR ASSISTING IN MANUAL TRANSMISSION SHIFTING

BACKGROUND OF THE INVENTION

This application relates to an engine speed synchronization system for assisting an operator in manually shifting a multi-speed transmission.

Heavy vehicles typically include a multi-speed transmission controlled by a manual stick shift. An engine drives the transmission through a selectively actuated clutch. The operator selects one of several transmission speeds to result in various ratios between the input speed from the engine and the output speed of the transmission.

In trucks, there are typically ten or more different speeds available. In shifting a clutch between the speed ratios, an operator may sometimes sequentially pass rapidly through the various speeds. As an example, an operator speeding up the vehicle may quickly pass through many of the gears in rapid succession.

The operation typically required to smoothly shift a truck transmission is relatively complex. Initially, a driver actuates the clutch to break the torque transmission from the engine to the transmission. This allows the operator to move gears in the transmission out of engagement to a neutral position. The operator will then typically re-engage the clutch and attempt to synchronize the speed of the engine with a speed necessary at the next selected speed ratio to achieve a constant speed ratio at the transmission outlet. That is, the operator attempts to achieve an engine speed such that once the new speed ratio is engaged, the speed ratio of the transmission and engine will be relatively constant. Complicating the synchronization is the fact that transmission output speed will be changing. A good deal of operator experience is required to even approximate the synchronization speed. Moreover, speed synchronization typically cannot be achieved identically, and the operator must again disengage the clutch such that torque is not transmitted through the drive train as the new gear is being engaged.

This multi-step method of shifting a gear is relatively complex and time consuming. Further, it relies upon an experienced operator having a feel for the desired speed at the next selected gear. As vehicles become equipped with more complex controls, operators are required to perform more complicated operation steps. Moreover, a typical truck operator today is less experienced than in the past. Many operators lack sufficient experience to have the feel required for the shifting and speed synchronization as described above.

The prior art has proposed systems that attempt to predict the speed that would be necessary at the next selected gear ratio and begin to move the engine speed to that desired speed to achieve speed synchronization. These systems have typically been more "proposed" systems than practical production systems. As an example, the systems generally assume that a controller for the engine will always know what gear the transmission is in. In fact, since the transmission may be provided with a clutch allowing the operator to completely manually perform a shift, the controller may not always know what gear the transmission is in. Moreover, if an operator skips shifts, or performs several shifts at once, the controller may not be aware of the multiple change. Without precise knowledge of the currently engaged gear it is difficult to predict the necessary synchronization speed ratio.

Moreover, the prior art has not proposed a system that adequately predicts whether an upshift or a downshift will occur next. Without an accurate prediction of whether an upshift or downshift is occurring, the engine controller has a difficult time in rapidly identifying the necessary speed ratio and moving the engine to achieve that speed ratio.

SUMMARY OF THE INVENTION

In a disclosed embodiment of this invention, an engine speed synchronization system continuously monitors the output speed of the transmission and the output speed of the engine and identifies the actual ratio of the two speeds. This actual ratio is compared to ratios in a look-up table to determine the currently engaged gear. Preferably, the determination is made and stored periodically.

Once the control knows the currently engaged gear, it identifies the next gear to be engaged. In one method, an operator is provided with a shift intent switch. The operator is able to indicate whether an upshift will occur next or that a downshift will occur next. These signals are sent to the control, which takes this operator intention signal and combines it with the previously identified currently engaged gear determination to determine what the next gear to be engaged will be. Once that determination is made, the control identifies the speed ratio at the next gear from the look-up table. Once the speed ratio is identified, the control multiplies that ratio with the actual transmission output speed to identify the desired engine speed for achieving a smooth synchronized shift to that gear.

In an alternative method, the controller monitors various operating parameters to identify whether an upshift or a downshift is most likely as the next shift. As an example, should the engine speed be above a certain upper threshold, one may predict that an upshift is likely. On the other hand, if the engine speed is below a certain lower threshold, one can predict that a downshift may be expected. Alternatively, the accelerator pedal position, engine output torque, vehicle speed, acceleration or other factors may be used to predict shift direction.

Under either method, the operator is allowed to manually shift the transmission out of gear to neutral. A signal is then sent to the controller that the transmission is in neutral. At that time, the control modifies the engine speed to achieve the synchronization speed ratio determined as set forth above. Since the transmission speed is typically changing during the shift, the necessary engine speed is repeatedly adjusted. The operator is then able to re-engage the gear at the next selected gear ratio. Once the gear is re-engaged, the engine control returns operation of the vehicle to the control of the operator.

These and other features of the present invention can be best understood from the following specification and drawings, of which the following is a brief description.

DETAILED DESCRIPTION OF THE PREFERRED EMBODIMENT

Figure 1:
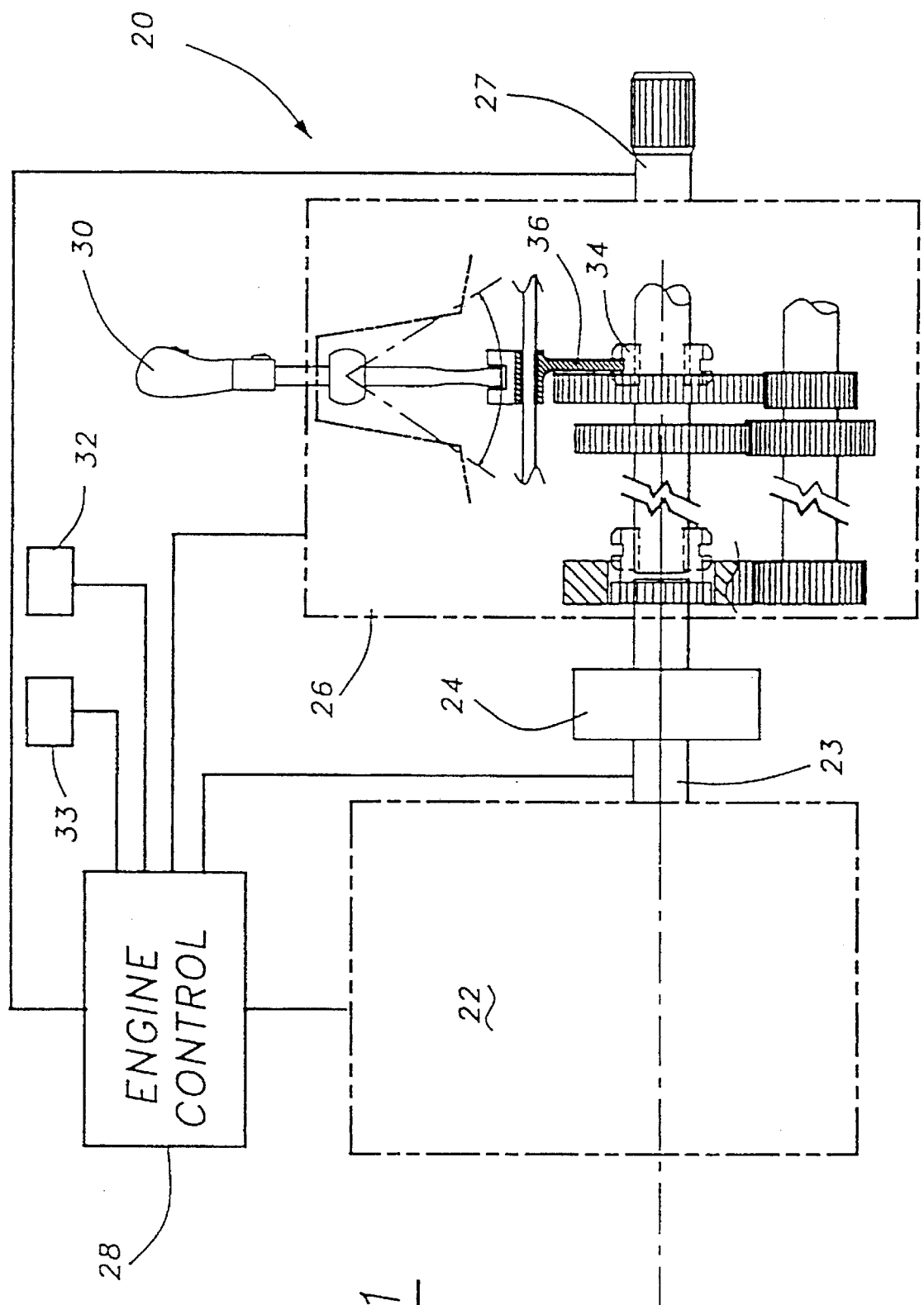
FIG. 1 is a schematic view of a vehicle drive.

FIG. 1 shows a vehicle drive 20 incorporating an engine 22 having an output shaft 23 connected through a selectively actuated clutch 24 to a multi-speed transmission 26. Transmission 26 has an output shaft 27. An electronic control unit 28 controls the speed of the engine 22 in a known manner. As an example, the electronic control unit may control the fuel flowing through a fuel valve to the engine to control the output speed on engine output shaft 23.

An operator is able to choose between the several speed ratios in the multi-speed transmission 26 through a manual stick shift 30. The operation of the stick shift is as known in the art and forms no portion of this invention. An operator is also provided with switch 32 to send a signal to the electronic control unit 28 of whether an upshift or a downshift is intended as the next shift. Switch 32 is preferably a two-position switch that may be moved between a first position indicating an upshift and to a second position indicating a downshift. Most preferably, the switch is of the type that completes a contact in one of the two positions and does not complete a contact in the other position. The switch preferably remains in either position until moved to the other position by the operator. The ECU 28 receive a switch signal of on or off and relates that signal to an upshift or a downshift. An operator who is rapidly making several sequential shifts in a single direction can leave the switch in either the up or down position through the entirety of the sequential shifts. An ON/OFF switch 33 enables or disables the entire speed synchronization system. Switches 32 and 33 are preferably mounted in stick shift 30. Although a single control 28 is shown it should be understood the separate controls could be used for the subsystems of this invention.

ECU 28 receives feedback from switch 32, switch 33, and the speeds of output shafts 23 and 27. A signal from the transmission 26 indicates whether the transmission is in neutral or in a gear engaged position.

Figure 2:
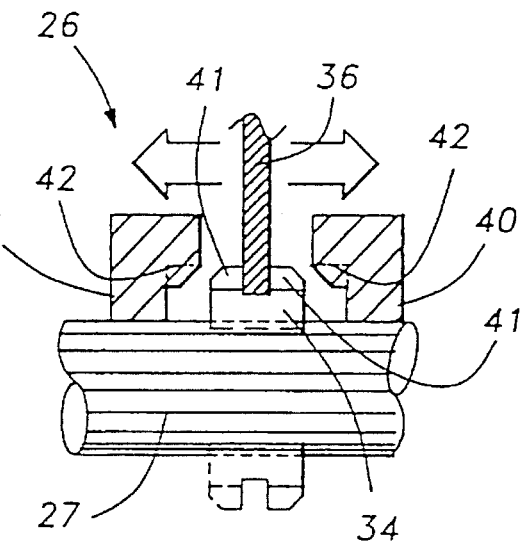
FIG. 2 shows a portion of a transmission according to the present invention.

As shown in FIG. 2, the transmission 26 is shifted between gears by moving a collar 34 through a yoke 36. Yoke 36 is moved by manual stick shift 30. The collar 34 is shown in a neutral position where it is not engaged with either of the gears 38 or 40. In one type of transmission, collar 34 has teeth 41 at two axial positions that are selectively brought into engagement with mating teeth 42 on one of the gears 38 or 40 to engage that gear. The collar rotates with the output shaft 27, and the gears 38 and 40 are being driven by the input from the engine at different speed ratios. By selecting one of the two gears 38 and 40, an operator is able to select different speed ratios. Again, the structure of the transmission forms no part of the invention and is merely being disclosed here to illustrate one aspect of the invention. Other types of transmission will come within the scope of this invention.

When an operator is moving the collar 34 to re-engage one of the gears 38 or 40, the shaft 27 is not being driven by any gear 38, 40. Instead, gears 38 and 40 are rotating at a speed dependent of the input speed from the engine shaft 23 combined with their individual gear ratios. Thus, as teeth 41 approach teeth 42, it is likely that they are rotating at very different speeds. In the past, an operator has actuated the clutch to break transmission of this rotation and has also attempted to synchronize the speeds to the best of the operator's ability. The present invention ensures that the selected gear 38 or 40 is rotating approximately at the same speed as the collar 34 such that the gear engagement will proceed smoothly.

Figure 3:
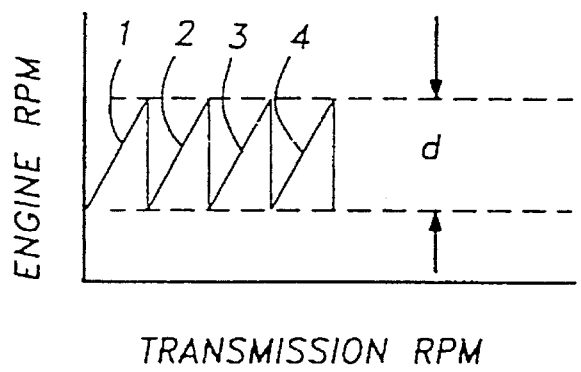
FIG. 3 is a graphic representation showing some of the vehicle operation features incorporated into this invention.

The result is generally as shown in FIG. 3, engine speed is plotted against transmission speed, at four different gears. The graph is simplified from real world values to illustrate a feature of this invention. The engine speed necessary to achieve a particular transmission speed decreases as the gear increases. Thus, as an operator moves from gear 1 to gear 2 as shown in this graph, there is a decreased amount of speed necessary at the new gear to achieve a constant transmission speed. That is, the speed ratio increases. Alternatively, that same distance d is required as an increase to engine speed when downshifting from gear 2 to gear 1. It is this change in engine speed that is provided by the present invention. In the past, the operator had to rely upon feel to achieve the speed change.

In an alternative to the use of the shift intent button 32, system conditions such as the saw tooth nature of the graph can also be utilized to predict when an upshift or a downshift should be expected next. As an example, if the system is in gear 1 and the ECU senses that the engine speed is relatively high and that the vehicle is accelerating, the control can predict that an upshift is to be expected. On the other hand, should the control sense that the engine speed is relatively low and decelerating then a downshift could be predicted. As discussed above, other system variables may assist in the prediction.

Figure 4:
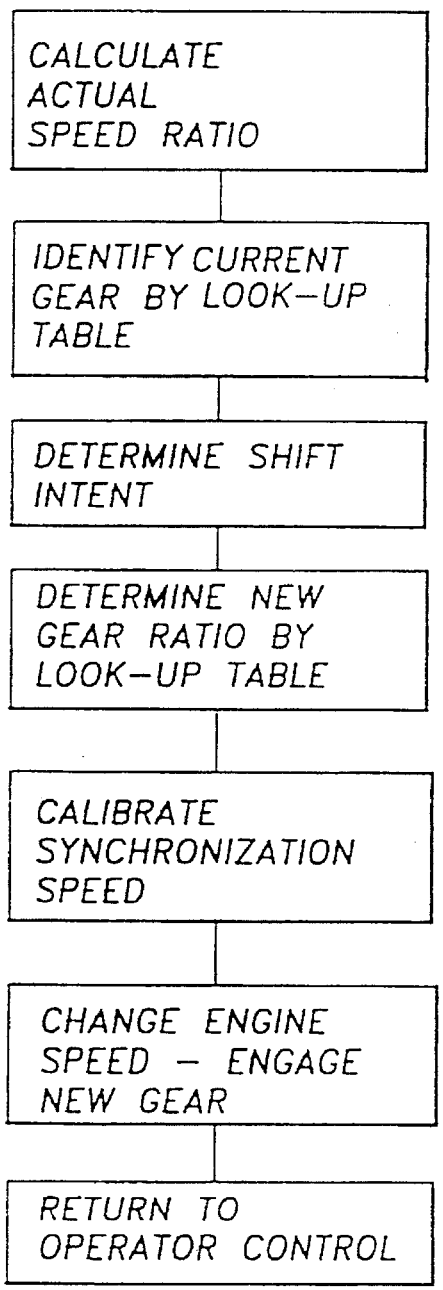
FIG. 4 is a flow chart of the method of the present invention.

FIG. 4 shows a logic for achieving speed synchronization. First, ECU 28 calculates the actual speed ratio of the shafts 23 and 27. That actual speed ratio is utilized to identify the current engaged gear by referring to a look-up table in a memory. Alternatively, a formula based determination may be used to determine the engaged gear based upon the ratio. The currently engaged gear is stored in a memory and is updated periodically. The last stored currently engaged gear prior to the transmission being moved to neutral is the one preferably utilized as the currently engaged gear in the rest of the method of this invention.

The system next identifies whether an upshift or a downshift is to be expected, and then identifies the next gear to be selected. The speed ratio at the next gear is obtained from the look-up table. Once the next speed ratio is known, the system can calculate the synchronization speed that will be necessary by multiplying that speed ratio by the transmission output speed.

The ECU 28 preferably identifies the engine speed necessary to achieve a synchronized shift, after the transmission has moved to neutral. Once the transmission has moved to neutral, ECU 28 determines the necessary speed and begins to modify the engine speed to achieve the desired speed ratio. The transmission speed is typically changing and the speed determination step is repeated periodically based upon changing transmission speed. The operator is then able to engage the clutch at the new gear. Once the gear is engaged, a gear engaged signal is sensed by ECU 28, which then returns control of the vehicle to the operator. Control also shifts back if the driver uses the clutch, or if a timer determines that an overly long time period has expired since actuation of the speed synchronization function. The neutral and engaged signals can both be positive signals or can be determined by only one positive signal.

The present invention provides valuable benefits when compared to the prior art. In the prior art, there was no monitoring of the currently engaged gear. Since the system will preferably allow the operator to complete a manual speed shift with the clutch, a simple counter on the number of assisted shifts is insufficient to identify the currently engaged gear with any degree of certainty. Skip shifts will also present difficulties to a counter based system. Continuous monitoring of the actually engaged gear provides much more reliable information.

Moreover, the present invention's use of a driver intent switch combined with a driver manually shifting the transmission also provides a more reliable system. Prior systems have typically required prediction of whether an upshift or downshift is to be expected as in the next shift. The intent switch provides a signal that is more reliable than the prior systems.

Most preferably, the inventive system is utilized in combination with other components and features as disclosed in U.S. patent application Ser. No. 08/508,155, entitled "Method and Apparatus for Assisting and Shifting Transmission to Neutral; still pending" U.S. patent application Ser. No. 08/508,153, entitled "Four Position Switch for Shift and Assist System; still pending" U.S. patent application Ser. No. 08/508,067, entitled "Two Position Neutral Switch for Multi-Speed Transmission; still pending" U.S. patent application Ser. No. 08/508,307, entitled "Operator Input System for Gear Shift Assist Mechanism; still pending" U.S. patent application Ser. No. 08/507,996, entitled "Automatic Range Shift for Multi-Speed Transmission; still pending" U.S. patent application Ser. No. 08/508,111, entitled "Engine Speed Retardation on Transmission Upshifts; still pending" and U.S. patent application Ser. No. 08/508,156, entitled "Combined System for Assisting Shifting of Manual Transmission now allowed." These applications are all filed on the same day as this application.

A preferred embodiment of this invention has been disclosed; however, a worker of ordinary skill in the art would recognize that certain modifications would come within the scope of this invention. For that reason, the following claims should be studied to determine the true scope and content of this invention.

We claim:

1. A method of controlling the operation of a vehicle drive comprising the steps of:

a) providing an engine having an output shaft, an electronic control unit for controlling the speed of said engine, a multi-speed trammission to be driven by said engine output shaft, a manual stick shift for allowing an operator to manually shift said multi-speed transmission between several speed ratios, and a driver intent switch allowing a driver to provide an indication to said electronic control unit of whether an upshift or a downshift is to be next expected, said electronic control unit using said driver intent signal to determine what the next speed ratio to be engaged by a manual shift by the operator will be, said electronic control unit then determining what engine synchronized speed would be necessary to achieve a synchronized shift to said next speed ratio at the present transmission output speed, and said electronic control unit being operable to change the output speed of said engine output shaft to achieve said synchronized speed;

b) operating a vehicle using the system provided in step a);

c) determining a currently engaged gear;

d) utilizing said driver intent switch to provide a signal of whether an upshift or a downshift will be the next expected shift;

e) determining a desired engine synchronization speed at a next expected gear by determining said next expected gear based upon said currently engaged gear and said shift intent signal of step d), identifying an engine synchronization speed by multiplying the speed ratio at said next expected gear with the current transmission output speed; and f) beginning to control said output speed of said engine output shaft to approach said synchronization speed, and g) manually shifting said multi-speed transmission to said next expected gear.

2. A method as recited in claim 1, wherein a signal is provided to said electronic control unit of when said multi-speed transmission has moved to neutral, and said electronic control unit beginning to change said engine speed once it receives said signal.

3. A method as recited in claim 2, wherein said electronic control unit determines said currently engaged gear by monitoring the output speed of said engine output shaft and said transmission output shaft, calculating a ratio, comparing said calculated ratio to expected ratios in a look-up table, and identifying said currently engaged gear by matching said calculated ratio to the look-up table ratios.

4. A method as recited in claim 3, where said identified currently engaged gear is stored, and is periodically identified during operation of the vehicle, and the stored currently engaged gear is updated when necessary.

5. A method as recited in claim 1, wherein an operator is provided with a switch to disable the speed synchronization system and control of engine speed is left to the operator during a shift when the system is disabled.

6. A method as recited in claim 1, wherein a clutch is disposed between said engine output shaft and said transmission.

7. A method as recited in claim 1, wherein an on-off switch is provided to the operator such that an operator may enable or disable the speed synchronization of step f) during a shift.

8. A method of controlling the operation of a vehicle, comprising the steps of:

a) providing an engine having an output shaft, an electronic control unit for controlling the speed of said engine output shaft, said engine output shaft being connected to drive a multi-speed transmission, and said electronic control unit being operable to calculate the ratio of the transmission and engine output shaft speeds, and determine which gear is currently engaged;

b) operating a vehicle using the system provided in step a);

c) determining a currently engaged gear by calculating the ratio of the engine and transmission output shaft speeds, and comparing said calculated ratio to expected ratios;

d) determining whether an upshift or a downshift is to be expected as the next shift;

e) determining a desired engine synchronization speed at a next expected gear by determining said next expected gear based upon said currently engaged gear and said expected shift of step d), and identifying an engine synchronization speed by multiplying the speed ratio at said next expected gear with the current transmission output speed; and f) beginning to control said output speed of said engine output shaft to approach said synchronization speed; and g) shifting said multi-speed transmission toward said next expected gear.

9. A method as recited in claim 8, wherein the determination of step d), includes providing an operator shift intention switch, and moving said switch between position indicating an upshift or a downshift as appropriate.

10. A method as recited in claim 9, wherein step f) does not occur until a signal is received that said transmission has moved into neutral.

11. A method as recited in claim 8, wherein said determination of step d) is made by said electronic control unit based upon vehicle operating parameters.

12. A method as recited in claim 11, wherein step f) does not occur until a signal is received that said transmission has moved into neutral.

13. A method as recited in claim 8, wherein step f) does not occur until a signal is received that said transmission has moved into neutral.

14. A method as recited in claim 8, where said identified currently engaged gear is stored, and is periodically identified during operation of the vehicle and the stored currently engaged gear is updated when necessary.

15. A method as recited in claim 8, wherein an operator is provided with a switch to disable the speed synchronization system and control of engine speed is left to the operator during a shift when the system is disabled.

16. A method as recited in claim 8, wherein a clutch is disposed between said engine output shaft and said transmission.

17. A method as recited in claim 8, wherein step e) is repeated periodically to consider changes in said transmission output speed.

18. A vehicle drive system comprising:
a) an engine having an output shaft;
b) an electronic control unit for controlling an output speed of said engine;
c) a multi-speed transmission operably connected to be driven by said engine output shaft;
d) a manual stick shift to allow an operator to change the speed ratios of said transmission; and
e) a driver shift intent switch to allow a driver to send a signal to said electronic control unit of whether an upshift or a downshift is to be next expected, said electronic control unit being operable to determine a currently engaged gear, determine a next expected gear based upon said currently engaged gear and said driver shift intent signal, determine a synchronization speed for shifting to said next expected gear, and change said engine speed to move toward said synchronization speed when a shift is being made.

19. A system as recited in claim 18, wherein said electronic control unit calculates and updates said currently engaged gear during operation of said system.

20. A system as recited in claim 18, wherein a clutch is disposed between said engine output shaft and said transmission.

21. A system as recited in claim 20, wherein an on/off switch is provided such that an operator may enable or disable said speed synchronization during a shift.

22. A system as recited in claim 18, wherein said driver shift intent switch remains in an upshift or downshift position until moved by an operator.

23. A system as recited in claim 18, wherein an on/off switch is provided such that an operator may enable or disable said speed synchronization during a shift.

24. A vehicle drive system as recited in claim 18, wherein said electronic control unit is provided with a look-table of the speed ratios at the several available gear in said multi-speed transmission.

25. A system as recited in claim 24, wherein said electronic control unit utilizes said look-up table to determine said currently engaged gear, and also to determine a speed ratio at said next expected gear.

26. A method of controlling the operation of a vehicle, comprising the steps of:
a) providing an engine having an output shaft, an electronic control unit for controlling the speed of said engine output shaft, said engine output shaft being connected to drive a multi-speed transmission through a clutch, and said electronic control unit being operable to determine a currently engaged gear in said transmission, and further to calculate the speed ratio at a next expected gear, and determine a synchronization speed for the engine based upon the speed ratio at said next expected gear, and the transmission output speed;
b) operating a vehicle using the system provided in step a);
c) periodically determining the currently engaged gear by monitoring system variables;
d) determining whether an upshift or a downshift is to be expected as the next shift;
e) determining a desired engine synchronization speed at a next-expected gear by determining said next expected gear based upon said currently engaged gear and said expected shift of step d), and identifying an engine synchronization speed by multiplying the speed ratio at said next expected gear with the current transmission output speed;
f) beginning to control said output speed of said engine output shaft to approach said synchronization speed; and
g) manually shifting said multi-speed transmission towards the next expected gear.

27. A method of controlling the operation of a vehicle, comprising the steps of:
a) providing an engine having an output shaft, an electronic control unit for controlling the speed of said engine output shaft, said engine output shaft being connected to drive a multi-speed transmission through a clutch, and said electronic control unit being operable to determine a currently engaged gear in said transmission, and further to calculate the speed ratio at a next expected gear, and determine a synchronization speed for the engine based upon the speed ratio at said next expected gear, and the transmission output speed, and providing an operator with a shift intent switch to provide a signal to said electronic control unit of whether an upshift or a downshift is expected as said next expected shift, said electronic control unit being operable to calculate the ratio of the transmission and engine output speeds to determine a currently engaged gear, and determine a next-expected gear based upon said currently engaged gear and said driver shift intent signal;
b) operating a vehicle using the system provided in step a);
c) determining a currently engaged gear;
d) determining whether an upshift or a downshift is to be expected as the next shift based upon a signal from said driver shift intent switch;
e) receiving a signal that said transmission has been moved to neutral;
f) determining a desired engine synchronization speed at a next-expected gear by determining said next expected gear based upon said currently engaged gear and said expected shift of step d), and identifying an engine synchronization speed by multiplying the speed ratio at said next expected gear with the current transmission output speed;

g) beginning to control said output speed of said engine output shaft to approach said synchronization speed; and h) manually shifting said multi-speed transmission towards said next expected gear.

28. A method of controlling the operation of a vehicle, comprising the steps of:

a) providing an engine having an output shaft, an electronic control unit for controlling the speed of said engine output shaft, said engine output shaft being connected to drive a multi-speed transmission through a clutch, and said electronic control unit being operable to determine a currently engaged gear in said transmission, and further to calculate the speed ratio at a next expected gear, and determine a synchronization speed for the engine based upon the speed ratio at said next expected gear, and the transmission output speed, and providing an operator with a shift intent switch to provide a signal to said electronic control unit of whether an upshift or a downshift is expected as said next expected shift, said electronic control unit being operable to calculate the ratio of the transmission and engine output speeds to determine a currently engaged gear, and determine a next-expected gear based upon said currently engaged gear and said driver shift intent signal;

b) operating a vehicle using the system provided in step a);

c) determining a currently engaged gear;

d) determining whether an upshift or a downshift is to be expected as the next shift based upon a signal from said driver shift intent switch;

e) receiving a signal that said transmission has been moved to neutral;

f) determining a desired engine synchronization speed at a next-expected gear by determining said next expected gear based upon said currently engaged gear and said expected shift of step d), and identifying an engine synchronization speed by multiplying the speed ratio at said next expected gear with the current transmission output speed;

g) beginning to control said output speed of said engine output shaft to approach said synchronization speed, and repeating steps e) and f); and h) manually shifting said multi-speed transmission towards said next expected gear.

29. A method as recited in claim 28, wherein said driver input means is part of said driver shift intent switch.

30. A method as recited in claim 28, wherein a manual stick shift is used to change the transmission speed ratios.

* * * * *